United States Patent

Tatro

[11] Patent Number: 5,984,612
[45] Date of Patent: Nov. 16, 1999

[54] TANK LIFTING DEVICE

[76] Inventor: Mark D. Tatro, 6800 N. Silvery La., Dearborn Heights, Mich. 48127

[21] Appl. No.: 09/143,005

[22] Filed: Aug. 28, 1998

Related U.S. Application Data

[60] Provisional application No. 60/090,342, Jun. 23, 1998.

[51] Int. Cl.[6] ............................... B62B 1/06; B66C 1/16
[52] U.S. Cl. ...................... 414/448; 294/67.22; 294/92; 294/119.2
[58] Field of Search ........................... 294/15, 16, 27.1, 294/29, 31.2, 67.1, 67.2–67.22, 67.5, 90, 92, 103.1, 119.2; 280/47.17, 47.19, 47.24, 47.34; 414/448, 449, 444, 592, 607, 608, 622

[56] References Cited

U.S. PATENT DOCUMENTS

| | | | |
|---|---|---|---|
| 1,250,602 | 12/1917 | Lobdell | 294/67.22 |
| 2,819,809 | 1/1958 | Hanson | 414/448 |
| 3,272,529 | 9/1966 | Rachman | 294/31.2 X |
| 4,565,397 | 1/1986 | Keen | 294/31.2 X |
| 4,615,656 | 10/1986 | Geraghty | 294/119.2 X |
| 5,501,497 | 3/1996 | Holloway | 294/67.22 X |
| 5,658,118 | 8/1997 | Luca | 414/448 X |

*Primary Examiner*—Johnny D. Cherry
*Attorney, Agent, or Firm*—Gifford, Krass, Groh, Sprinkle, Anderson & Citkowski, P.C.

[57] ABSTRACT

A lifting device for lifting cylindrical tanks of the type used by welders is disclosed. The lifting device comprises an elongated lifting arm having a bracket pivotally secured to a midpoint of the arm. Both ends of a chain are secured to the bracket and the chain is dimensioned so that, with the bracket in abutment against the side of the tank, the chain extends around the tank. An abutment member is secured to a lower first end of the lifting arm so that, as the second upper end of the lifting arm is lifted, the tank is mechanically locked between the chain, bracket and the abutment member. A lifting cart having a hoist assembly for lifting the lifting arm is also disclosed.

11 Claims, 3 Drawing Sheets

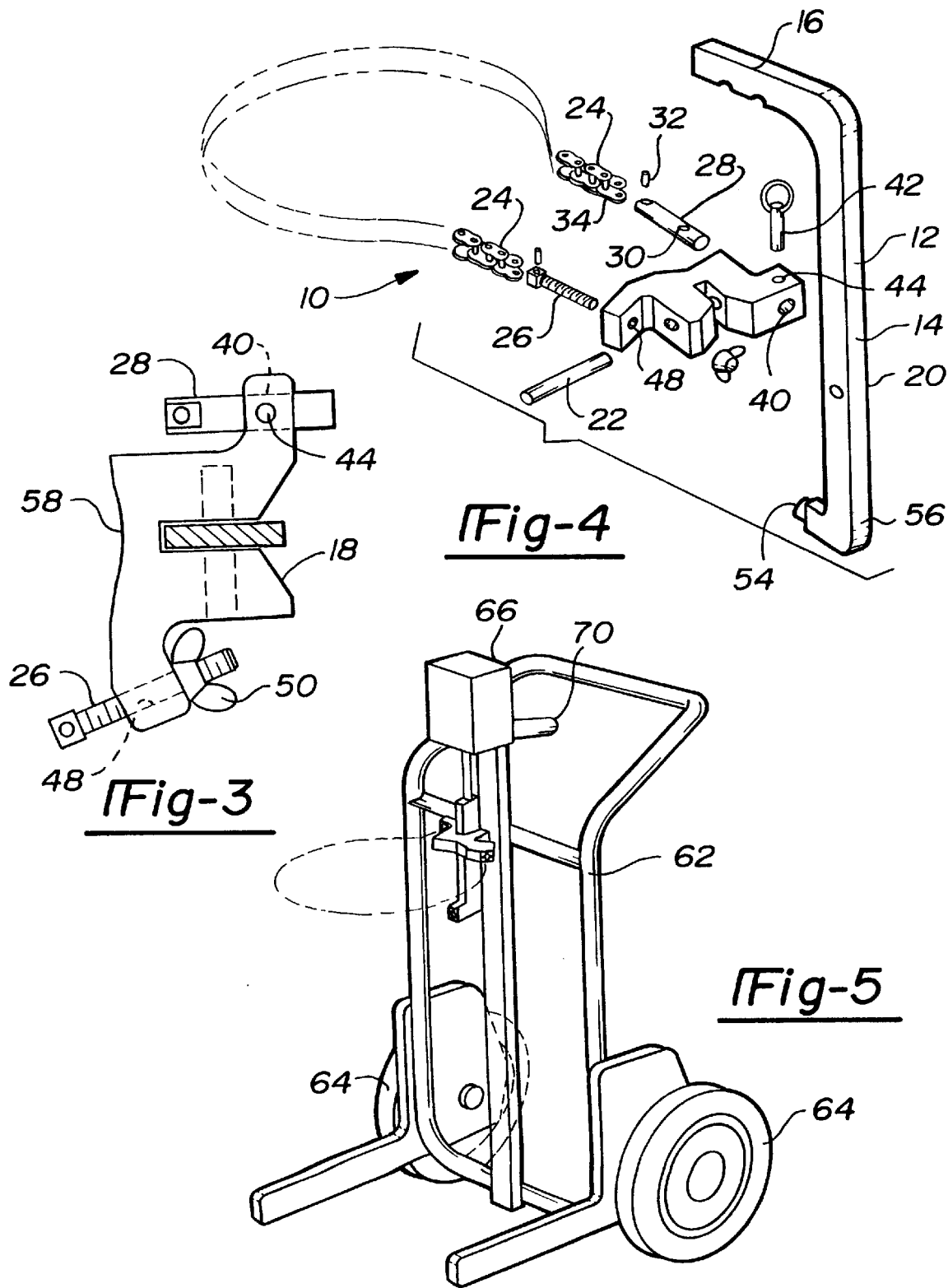

TANK LIFTING DEVICE

RELATED APPLICATION

This application claims the benefit of U.S. Provisional Application Ser. No. 60/090,342 filed Jun. 23, 1998.

BACKGROUND OF THE INVENTION

I. Field of the Invention

The present invention relates generally to lifting devices and, more particularly, to such a device particularly designed for lifting cylindrical tanks.

II. Description of the Prior Art

In the welding industry of the type utilizing a combustible gaseous mixture, the combustible gas or gasses are contained in high pressure cylindrical tanks. These tanks must be frequently moved within the shop in order to accommodate the particular welding operation.

In order to move these tanks within a shop, it has been the previous practice for either workmen to manually lift the tank or roll the tank along its bottom. Such tanks, however, are very heavy in construction which makes moving the tank not only a difficult procedure, but also potentially dangerous.

SUMMARY OF THE PRESENT INVENTION

The present invention provides a lifting device for lifting cylindrical tanks which overcomes all of the above-mentioned disadvantages of moving cylindrical tanks in a manufacturing environment.

In brief, the lifting device of the present invention comprises an elongated lifting arm having a bracket pivotally secured to a midpoint of the arm. A chain has one end secured to one side of the bracket and its other end detachably secured to the other side of the bracket. A threaded adjustment member between the bracket and one end of the chain adjustably varies the effective length of the chain in order to achieve a snug fit of the chain around the tank.

An abutment member is secured to a lower end of the lifting arm. This abutment member is adapted to abut against the side of the tank at a position spaced below the bracket and the chain.

With the chain snugly secured around the tank, upon exerting a lifting force on the upper end of the lifting arm, the tank is mechanically locked between the bracket, chain and the abutment member. Any conventional means, such as a hoist, can be used to lift the lifting arm.

In a modification of the invention, a cart is provided for moving the tank once elevated. The cart includes a hoist assembly which is secured to the upper end of the lifting arm. Once the tank is elevated off the ground, wheels on the cart permit the tank to be easily moved within the manufacturing environment.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 3 is a top partial sectional view illustrating one component of the preferred embodiment of the invention;

FIG. 4 is an exploded view illustrating the preferred embodiment of the present invention;

FIG. 5 is an elevational view illustrating a modification of the preferred embodiment of the present invention.

DETAILED DESCRIPTION OF A PREFERRED EMBODIMENT OF THE PRESENT INVENTION

Figure 1:
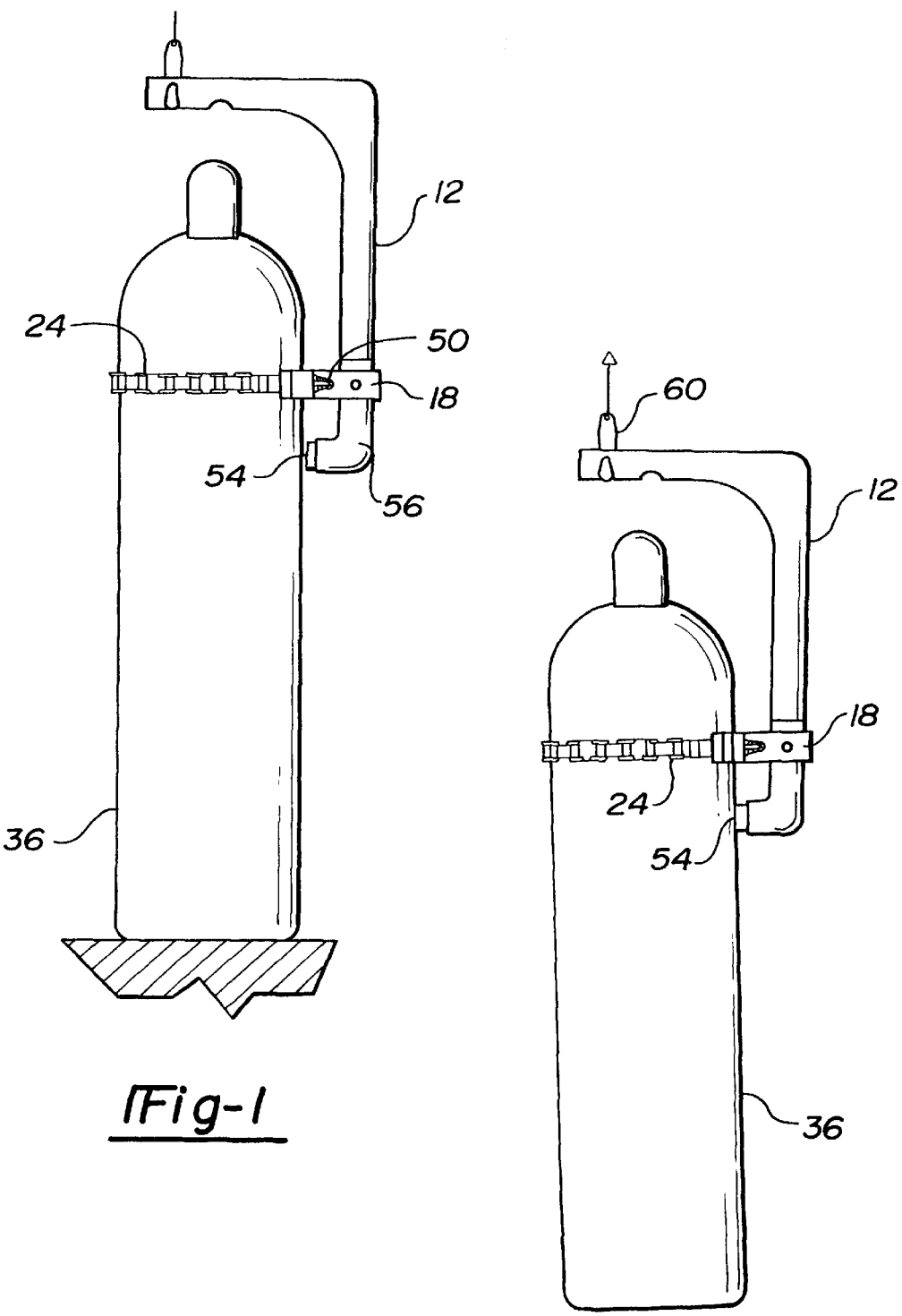
FIG. 1 is a side view illustrating a preferred embodiment of the present invention.

With reference first to FIGS. 3 and 4, a preferred embodiment of the lifting device 10 of the present invention is there shown and comprises in elongated lifting arm 12. The lifting arm 12 is preferably L-shaped thus having a first leg 14 and a second leg 16.

A bracket 18 is pivotally mounted to a midpoint 20 of the first leg 14 of the lifting arm 12 by a pivot pin 22. The pivot pin 22 allows the entire bracket 18 to pivot slightly around a substantially horizontal axis.

An elongated flexible member, such as a chain 24, has an elongated bolt 26 secured to one end 28. Similarly, an elongated pin 28 having a through hole 30 is secured by a pin 32 to the other end 34 of the chain 24. Furthermore, the chain 24 is dimensioned to extend around a cylindrical tank 36 (FIG. 1) of the type used by welders for their gas supply.

Still referring to FIGS. 3 and 4, the pin 28 is adapted to be positioned within a receiving hole 40 on one side of the bracket. With the pin 28 positioned in the hole 40, a locking pin 42 (FIG. 4) is insertable through a transverse hole 44 in order to releasably lock the end 34 of the chain 24 to one side of the bracket 18.

Similarly, the bolt 26 is slidably received through a bore 48 on the other side of the bracket 18. A nut 50 (FIG. 3) threadably engages the bolt 26 to secure the bolt 26, and thus the end 28 of the chain 24, to the bracket 18. furthermore, rotation of the nut 50 effectively varies the overall length of the chain 24 in order to achieve a snug fit of the chain 24 around the tank 36.

As best shown in FIGS. 1 and 4, an abutment member 54 is secured to a lower or first end 56 of the lifting arm 12. This abutment member faces in the same direction as the chain 24 and is adapted to abut against the side of the tank 36 at a position spaced below the chain 24.

As best shown in FIG. 3, the bracket 18 includes a notched surface 58. This notched surface 58 is adapted to abut against and conform to the outer shape of the circular tank 36.

Figure 2:
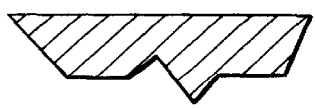
FIG. 2 is a view similar to FIG. 1, but illustrating the tank in an elevated position.

With reference now to FIGS. 1 and 2, the operation of the lifting device 10 of the present invention will now be described. In order to attach the lifting device 10 to the tank 36, the chain 24 is positioned around the tank 36 and the pin 28 is locked to the bracket 18 (FIG. 4) by the locking pin 42. The nut 50 is then tightened somewhat until the chain 24 is snug around the tank 36.

The upper end of the lifting arm 12 is then elevated, as shown in FIG. 2, by any conventional means, such as a hoist 60. In doing so, the bracket 18 pivots slightly in a counter-clockwise direction, as viewed in FIG. 2, such that the tank 36 is mechanically locked between the chain 24, surface 58 (FIG. 3) of the bracket 18 and the abutment member 54. The hoist 60 is then used to move the tank 36 to the desired position.

Once the tank 36 is moved and replaced on the ground support surface, the lifting device 12 of the present invention is quickly removed from the tank 36 by loosening the nut 50 and then removing the locking pin 42 which releases the chain 24 from the tank 36.

Figure 6:
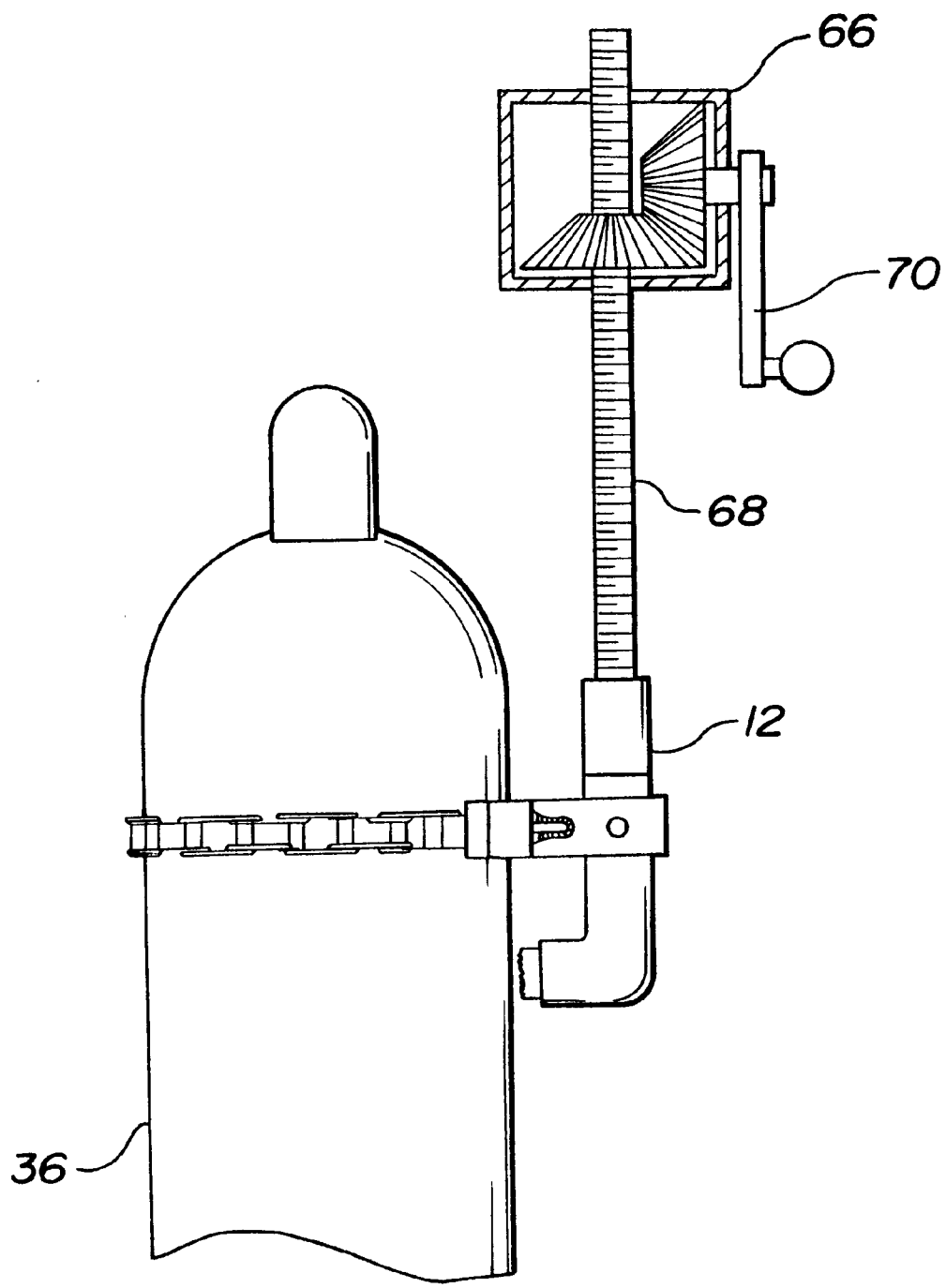
FIG. 6 is a fragmentary sectional view of the embodiment of the invention illustrated in FIG. 5.

With reference now to FIGS. 5 and 6, a second embodiment of the present invention is there shown which is particularly useful for situations in which a hoist is unavailable. As shown in FIGS. 5 and 6, a cart 62 having wheels 64 is used to transport the tank 36. A hoist assembly 66 is secured to the cart 62. An elongated shaft or other elongated means 68 then extends between the top of the lifting arm 12 and the hoist assembly 60. The lifting device is the same as has been previously described with respect to FIGS. 3 and 4 so that a further description thereof is unnecessary.

In order to lift the tank 36 relative to the cart 62, the hoist assembly 66 is activated by rotating its handle 70 in order to elevate the tank 36 relative to the cart 62. Once elevated, the cart 62 is used to transport the tank 36 to the desired location.

Although the hoist assembly 66 is illustrated in FIG. 6 as comprising a bevel gear arrangement, it will be understood, of course, that other types of hoists can be used without deviation from the spirit or scope of the invention.

From the foregoing, it can be seen that the present invention provides a unique lifting device which is particularly useful for elevating cylindrical tanks of the type used by welders. Having described my invention, however, many modifications thereto will become apparent to those skilled in the art to which it pertains without deviation from the spirit of the invention as defined by the scope of the appended claims.

I claim:

1. A device for lifting a cylindrical tank comprising:

an elongated lifting arm having a first end and a second end, a bracket pivotally mounted to a midpoint of said lifting arm, and an elongated flexible member having two ends, means for securing said ends of said flexible member to said bracket so that said flexible member extends around the tank, an abutment member secured adjacent said first end of said lifting arm, said abutment member adapted to abut against the tank, wherein with said flexible member positioned around the tank and said second end of said lifting arm being positioned above said first end of said lifting arm, upon lifting said second end of said lifting arm, the tank is mechanically locked between said flexible member, said bracket and said abutment member.

2. The invention as defined in claim 1 wherein said flexible member comprises a chain.

3. The invention as defined in claim 1 wherein said securing means comprises means for releasibly securing one end of said flexible member to said bracket.

4. The invention as defined in claim 1 wherein said lifting arm is L-shaped.

5. The invention as defined in claim 1 and comprising means for mechanically lifting said second end of said lifting arm.

6. The invention as defined in claim 5 wherein said mechanical lifting means comprises a cart, a hoist assembly secured to said cart, and elongated means extending between said hoist assembly and said second end of said lifting arm.

7. The invention as defined in claim 6 wherein said elongated means comprises a shaft.

8. The invention as defined in claim 7 wherein said hoist assembly comprises a gear box.

9. The invention as defined in claim 5 and comprising wheels secured to said cart.

10. The invention as defined in claim 1 and comprising means for varying the length of said flexible member.

11. The invention as defined in claim 10 wherein said varying means comprises a threaded shaft secured to one end of said flexible member, said shaft slidably extending through an opening in said bracket, and a nut for threadably engaging said threaded shaft.

* * * * *